United States Patent Office 3,543,528
Patented Dec. 1, 1970

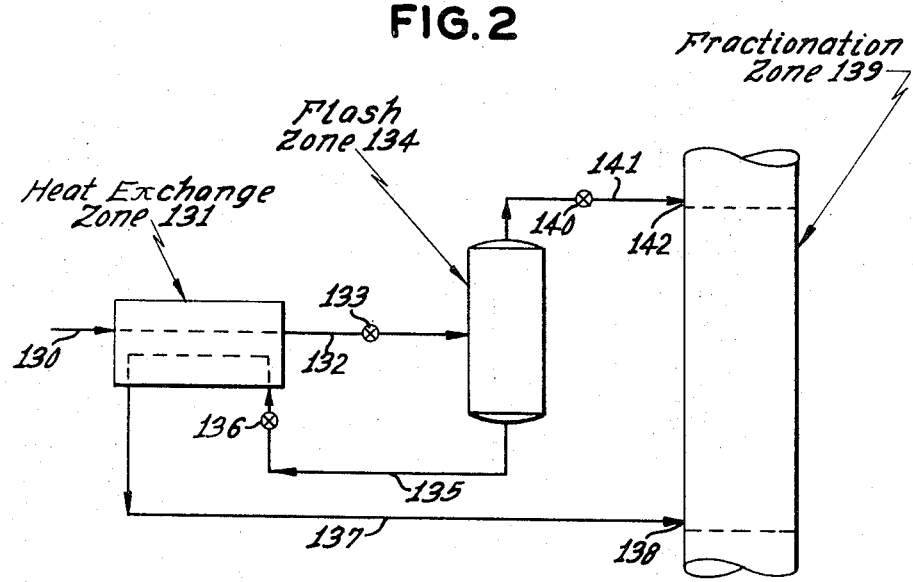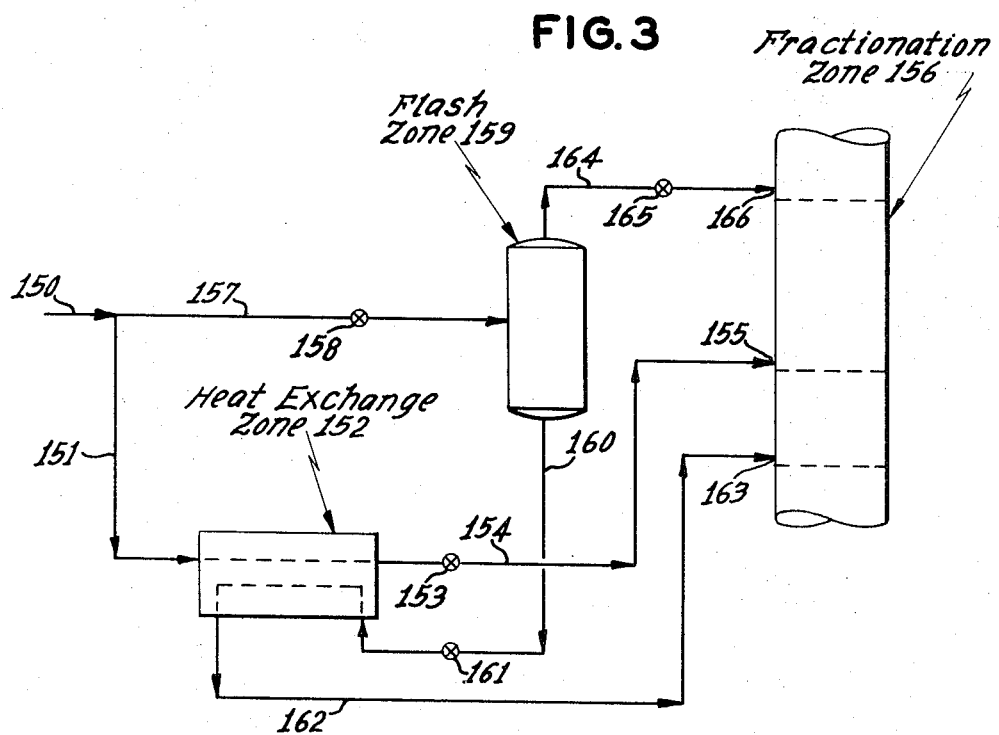

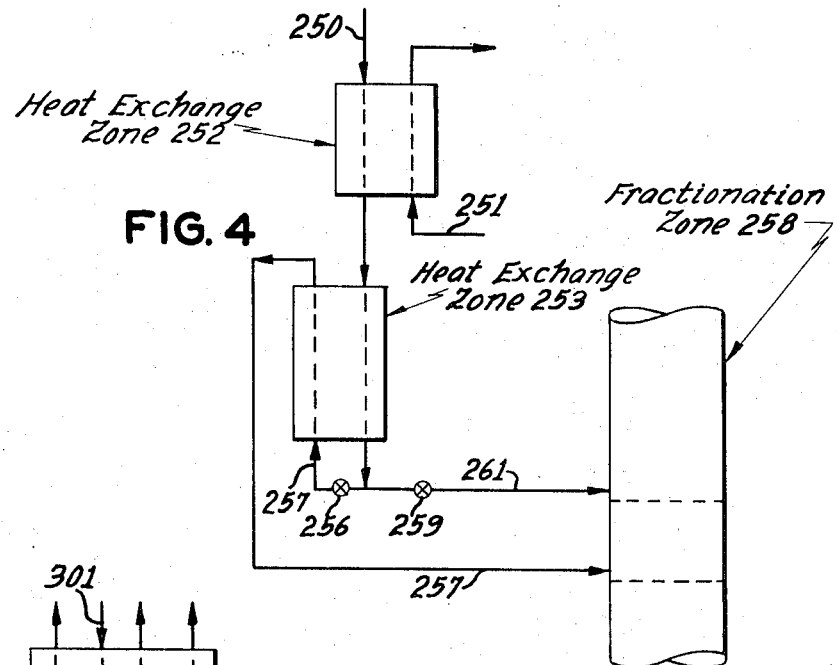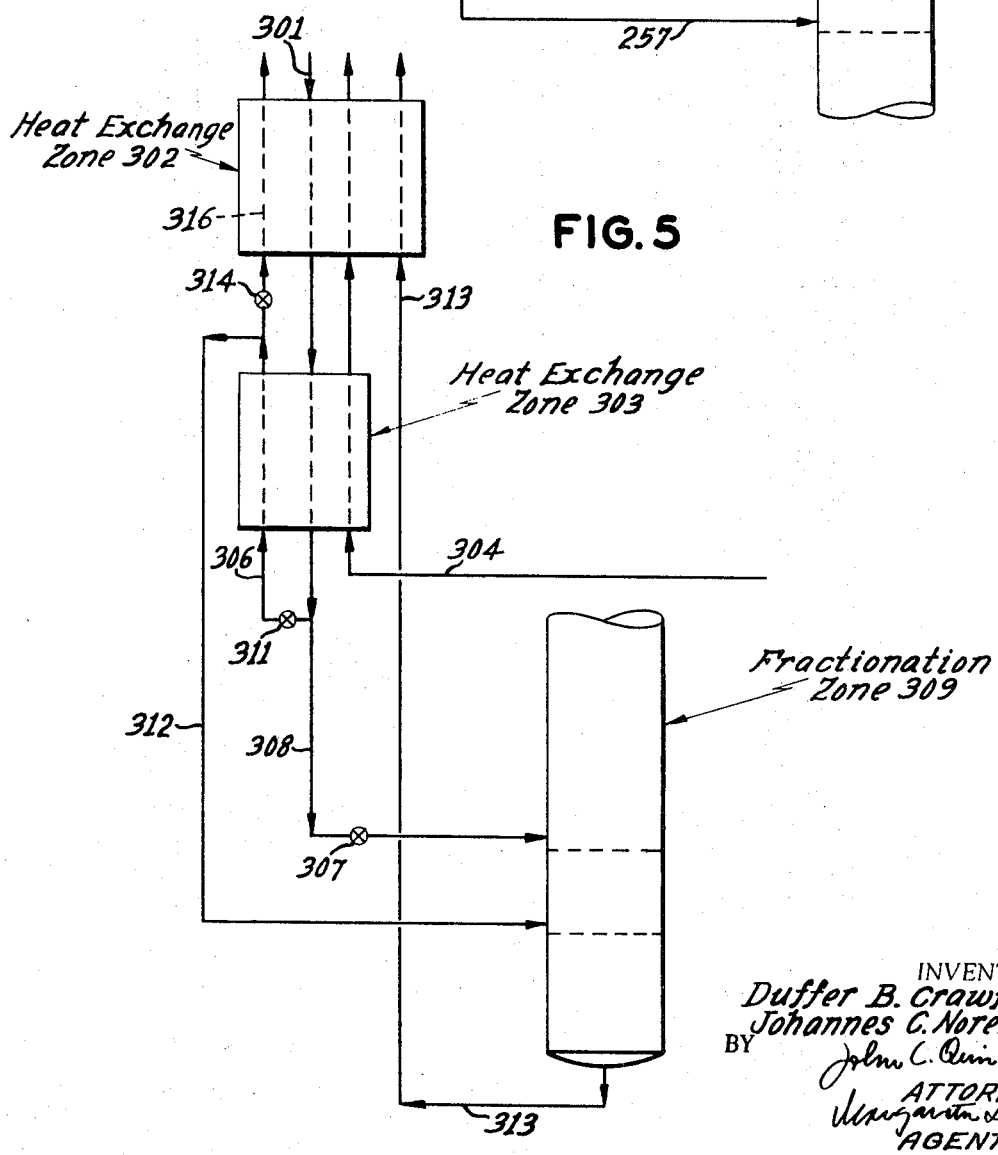

3,543,528
SEPARATION OF LOW-BOILING GAS MIXTURES
Duffer B. Crawford, Westfield, N.J., and Johannes C. Norenburg, New York, N.Y., assignors to Pullman Incorporated, Chicago, Ill., a corporation of Delaware
Continuation-in-part of application Ser. No. 438,900, Mar. 11, 1965. This application Aug. 1, 1967, Ser. No. 657,662
Int. Cl. F25j 3/04
U.S. Cl. 62—22   23 Claims

ABSTRACT OF THE DISCLOSURE

A process for prefractionation of a feed mixture comprised of at least two components prior to introduction to the main fractionation zone, wherein substantially liquid feed maintained at pressures higher than that prevailing in the fractionation zone is cooled by indirect heat exchange, part or all of said cooled feed is flashed at a pressure at least above that of the fractionation zone, to produce flashed material having a liquid phase and a vapor phase. The refrigeration potential of the flashed material is utilized for cooling of the feed by indirect heat exchange with a liquid or mixed phase portion of said flashed material thereby increasing the vapor-to-liquid ratio of the latter prior to its introduction to the fractionation zone at a suitable point. Remaining feed is introduced to the fractionation zone at one or more other suitable points.

Preferred feeds disclosed are nitrogen-containing mixtures, such as mixtures comprising nitrogen and methane, nitrogen and argon, nitrogen, methane and argon. A specific example is included as to the application of the invention to the separation of the individual components of an ammonia synthesis purge gas and to the recovery of argon in either liquid or gaseous form.

---

This application is a continuation-in-part of Ser. No. 438,900 filed Mar. 11, 1965, now abandoned.

The invention relates to the separation of a multi-component system into its individual components and more specifically to the overall separation of a multi-component system into its individual components by exploiting the energy available from the pressure of the feed, reducing the need for a separate refrigeration cycle as has been employed in other schemes.

In one aspect the invention relates to the prefractionation of a feed to a fractionation tower. In another aspect the invention pertains to the separation of a mixture comprising methane and nitrogen. A further aspect of the invention relates to the separation of the components of an ammonia synthesis purge gas. Still another aspect relates to the recovery of argon of high purity in liquid or gaseous state from ammonia synthesis purge gas.

Briefly, in the synthesis of ammonia, the fresh feed gas is produced in a process comprising a number of steps starting with primary reforming of a hydrocarbon, e.g., natural gas. As the ammonia synthesis is carried out at a pressure substantially higher than that employed in the preparation of the feed to the synthesis, the feed gas is introduced into the ammonia synthesis reactor via a compressor. The effluent from the ammonia synthesis reactor is cooled to condense out the ammonia product and the unreacted gases are compressed and returned to the ammonia synthesis loop as recycle gas.

The feed gas to the ammonia synthesis reaction consists essentially of nitrogen and hydrogen in a mole ratio of the order of 1:3, but also of impurities depending upon the starting material used for the preparation of the synthesis gas. Although these impurities are not harmful to the ammonia reaction as such, they will build up in the reactor system and cause a dilution of the synthesis gas. As the diluent content of the synthesis gas increases, the necessary size of the ammonia converter will increase to achieve constant conversion per pass with an inherent increase in cost. On the other hand the cost of maintaining a constant level of impurities by withdrawing a purge gas stream from the synthesis loop is a function of diluent concentration, i.e., as the concentration increases, less ammonia product and unconverted synthesis feed are lost from the reactor system. Thus, there is an optimum concentration of diluents for which the combined cost of incremental plant investment and removal of the impurities is at a minimum. Most commercial ammonia plants are designed to tolerate a certain amount of such impurities, which varies with the pressure at which the reaction is carried out, e.g., about 14% at 2000 p.s.i., and this quality is maintained by withdrawing a portion of the recycle gas stream as a purge gas stream. This purge gas which contains ammonia product, unreacted hydrogen and nitrogen and the impurities methane, argon and in some cases other rare gases, is usually reduced in pressure and burned in the primary reformer furnace, since the recovery of the components of the purge gas by previous proposed methods has proven to be relatively less attractive owing to the added equipment and operating cost of the required refrigeration circuit.

It is therefore a principal object of the present invention to provide an economically and commercially feasible method for the recovery of the individual components of an ammonia synthesis purge gas.

Another object of the invention is to provide a process for the recovery of the individual components in an ammonia synthesis purge gas which is essentially self-sufficient in heating and cooling requirements and which obviates the use of extraneous power other than the pressure energy contained in the feed gas.

Another object of the invention is to provide a method of minimizing the reboiler requirements of a fractionation tower.

Another object of the invention is to provide a method of minimizing the reflux cooling requirements of a fractionation tower.

Another object of the invention is to provide a method for fractionation of a mixture comprising methane and nitrogen.

Another object of the invention is to provide an economically attractive and feasible process for the production of argon of high purity.

Still another object of the invention is to maximize the efficiency of argon recovery from an ammonia purge gas stream.

It is still another object of this invention to effect the separation of a methane fraction from a nitrogen/argon fraction without the use of compression equipment which would ordinarily be required to achieve condensation of the reflux as well as of a sufficient portion of said nitrogen/argon fraction to allow the production of a major portion of the argon in liquid form from the subsequent fractionation.

Another object of the invention is to increase the yield of ammonia without changing the operating conditions of the ammonia synthesis reactor.

Another object of the invention is to reduce fresh synthesis gas requirements to an ammonia converter.

Various other objects and advantages of the invention will become apparent from the following detailed description and discussion.

According to the process of the invention the above objects are accomplished by prefractionation of at least part of the feed to a fractionation zone by flashing at least part of the feed mixture at a pressure at least above that of the fractionation zone to obtain a vapor phase and a liquid phase, partially vaporizing liquid phase by indirect heat exchange with feed mixture, passing partially vaporized liquid phase to the fractionation zone, and passing vapor phase to the fractionation zone.

The prefractionation of the feed to a fractionation tower is applicable to any fractionation of a binary or multi-component feed. Such a feed can either be normally gaseous or normally liquid or a mixture of normally gaseous and normally liquid components. The invention is used with particular advantage in the fractionation of nitrogen-containing feeds such as mixtures comprising nitrogen and methane and nitrogen and argon. The requirement for the invention to work in the intended manner is that the feed to the prefractionation zone, comprising a heat exchanger zone and a flash zone, is introduced at a pressure substantially higher than that of the fractionation zone, which can be operated at pressures ranging from subatmospheric to superatmospheric and at a temperature so selected that the feed to the prefractionator is substantially in a liquid or supercritical dense fluid state and that after flashing at a lower pressure the feed would be only partially vaporized. Liquid after flashing, either separated from the vapor phase or as part of the resulting flashed stream, is withdrawn and subsequently vaporized by indirect heat exchange with the incoming feed to the prefractionator. The selection of feed pressure, feed temperature, flash zone pressure and amount of liquid to be vaporized can be optimized for any given fractionation case using, for example, Ponchon-Savarit's diagram.

In one aspect of the invention all of the high pressure liquid is cooled in the heat exchanger section of the prefractionation zone prior to flashing of all of the cooled liquid, i.e., all of the feed to the fractionation zone will be subjected to prefractionation.

In another aspect of the invention the cooled portion of the high pressure liquid is fed directly to a fractionation zone at a suitable point. The remaining part of the high pressure liquid is flashed at a reduced pressure to produce a vapor phase and a liquid phase. A portion of said liquid phase is withdrawn and heat exchanged with the part of the high pressure liquid undergoing cooling, to vaporize at least a major portion of said liquid phase, and the resulting material is introduced at a suitable point of the fractionation zone where said material at the conditions of the zone will be in substantial equilibrium with the material undergoing fractionation in the zone at that point. The vapor phase and remaining liquid portion are fed to the zone at a point where this stream at the conditions of the zone will be in substantial equilibrium with the material undergoing fractionation in the zone at that point.

In still another aspect of the invention, substantially liquid feed at high pressure is cooled in a heat exchange zone, cooled feed is reduced in pressure in a flash zone under conditions of pressure and temperature so selected that only minor quantities of the liquid feed are vaporized and the need for separation of the vapor and liquid phases is obviated. Resulting vapor-liquid mixture of lower temperature is reheated in the heat exchange zone for further vaporization and at least a portion thereof is subsequently fed to the fractionation zone at a suitable point. Reheating of said vapor-liquid mixture in the heat exchange zone is carried out by indirect heat exchange with the above-mentioned high pressure feed of higher temperature. Further heating can be accomplished, if necessary, by indirect heat exchange with other suitable and warmer streams either in the same heat exchange zone or in one or more subsequent heat exchange zones.

All of the cooled feed can be flashed in the flash zone, in which case only part of the flashed feed is reheated in the heat exchange zone to increase the vapor-to-liquid ratio thereof prior to introduction into the fractionation zone. A remaining part of the cooled and flashed feed is passed to the fractionation zone at another suitable point.

In a more preferred aspect, however, two separate flashings are carried out, thereby obtaining a better control over the compositions of the streams entering the fractionation zone. Specifically, part of the cooled feed exiting the heat exchange zone is withdrawn, flashed, reheated in the heat exchange zone and at least a portion of the resulting stream of relative high vapor-to-liquid ratio is introduced to the fractionation zone. A remaining portion of the cooled liquid feed exiting the heat exchange zone is subjected to a separate flashing and subsequently introduced to the fractionation zone.

It is to be understood that the invention is also applicable to a multistep prefractionation technique of the feed, e.g., a two-step process would be one where a part of the liquid withdrawn from the flash zone is subjected to a second prefractionation, and so on. However, with every additional step the efficiency of the fractionation decreases, and in most cases a maximum of two steps will be employed.

The prefractionation of a feed to a fractionation zone according to anyone of these alternatives is a most important feature of the invention, in that the reflux cooling requirements and the reboiler duty will be considerably decreased and the need for an intermediate reboiler to prevent a fractionation 'pinch' in the tower will be obviated. The cooling requirements as well as the reboiler requirements of the fractionation zone can in some cases (as in the example which is shown below) be supplied by heat exchange with other process streams, and the need for extraneous utilities can be completely disposed of. This feature of the invention is one of the main contributing factors for the commercial feasibility and economical attractiveness of the process.

In order to further describe and illustrate the invention, specific references will be made to applications of the invention to treatment of a purge gas from an ammonia synthesis process, but it will be understood that the invention is not so limited.

The purge gas is withdrawn from an ammonia synthesis loop at synthesis pressure. The gas which can have a temperature ranging from about $-20°$ F. to about $+100°$ F. is cooled by indirect heat exchange with colder process streams to a temperature slightly above the solidification point of ammonia to liquefy a major portion of the ammonia, which may be withdrawn as one of the products of the process or it may be partially or wholly utilized to supply part of the necessary refrigeration for the purge gas cooling step. The residual portion of ammonia is then removed by any suitable method, e.g., the ammonia-lean gas can be subsequently fed into an adsorption zone where the remaining quantities of ammonia are removed. Molecular sieves, activated charcoal or alumina are some of the suitable materials for the adsorption. Preferably, at least two zones are operated in parallel such that when half of the number of zones are being used for the adsorption, the others are in a stage of regeneration. The ammonia-free gas is subsequently cooled to a temperature which can range from $-270°$ F. to below $-300°$ F., and which is sufficient to condense a major part of the nitrogen, argon and methane present in the gas. In the case where the purge gas originates from a so-called high pressure ammonia synthesis, e.g., a process employing pressures in excess of 4,000 p.s.i., it will be necessary to cool the ammonia-free gas to lower temperatures than those required at lower pressures, owing to the approach to the critical point of the mixture. It is, therefore, preferred to reduce the pressure of the ammonia-free gas to between about 500 p.s.i.a. and about 2500 p.s.i.a. prior to the condensation step. The remaining gas which is rich in hydrogen constitutes one of the products of the process and is returned to the ammonia synthesis loop by way of the recycle gas compressor. The condensate is flashed at a reduced pressure which can range from about 200 p.s.i.a. to about 500 p.s.i.a. and preferably at the suction pressure of the ammonia synthesis fresh feed gas compressor. The resulting second hydrogen-rich gas is a product of the process and it is returned to the ammonia synthesis loop by way of the fresh feed gas compressor. Both the first and the second hydrogen-rich gases may be utilized to provide part of the refrigeration necessary to cool and condense the ammonia-free gas as well as the purge gas.

In one of the preferred aspects of the invention, the first hydrogen-rich stream is heated to a suitable temperature by indirect heat exchange with the condensing ammonia-free gas, and at least a portion of said hydrogen-rich stream is expanded thereafter at about the same pressure as that used for stripping the condensate of the second hydrogen-rich stream. The temperature and the size of the portion are so selected that the expanded gas will attain a temperature as required to effect the desired partial condensation of the ammonia-free gas. The expanded stream is mixed with the depressured condensate and the combined streams are fed to a flashing zone. The expanded gas together with the vapor from the flashed condensate exchange heat with the condensing ammonia-free gas and provide thus, at least part of the necessary refrigeration to cool and partially condense the said ammonia-free gas. Also, since the presence of hydrogen in appreciable quantities in subsequent fractionation steps will have a deleterious effect upon the efficiency of the argon recovery, it is desirable to remove as much of the hydrogen as possible prior to the fractionation. It is preferable to submit the remaining liquid to a second flash at a lower pressure which may range from about 50 p.s.i.a. to about 200 p.s.i.a., to remove a substantial part of the residual hydrogen for the same reasons. Refrigeration may be recovered from the flash gas, after which it may be burned in the primary reformer furnace as part of the process tail gas. The pressure of the residual liquid is then increased by means of a pump to a value which may range from about 1,000 p.s.i.a. to about 3,000 p.s.i.a., and its temperature is raised to a value which can range from about —130° F. to about —80° F. by indirect heat exchange with a warmer process stream. This is another important feature of the invention in that the temperature and pressure of the liquid stream are chosen in such a way that said stream will become a highly efficient heat exchange medium owing to its specific heat being well matched to that of the other streams with which it exchanges heat. Furthermore, it is possible in this way to achieve independent thermal balance for the subsequent fractionation system, which results in a simplified heat exchange system and easier control.

At least part of the high pressure liquid is fed to the heat exchanger section of a prefractionation zone, where the liquid is cooled to a temperature which can range from about —180° F. to about —130° F. At least part of the high pressure liquid is flashed at a reduced pressure which can range from about 150 p.s.i.a. to about 400 p.s.i.a. and which is at least that employed in the subsequent fractionation, to produce a vapor phase of lower boiling material and a liquid phase of higher boiling material, both phases having decreased temperature as a result of the flashing. A portion of the liquid phase at reduced pressure is withdrawn and at least partially vaporized by indirect heat exchange with the incoming feed to the heat exchange zone of the prefractionator, and the resulting material is introduced at a temperature which can range from about —220° F. to about —200° F. at a suitable point of the fractionation zone, where said material at the conditions of the fractionation zone will be in substantial equilibrium with the material undergoing fractionation in the zone at that point. The vapor phase and the remaining liquid portion from the flash zone are fed to the fractionation zone at a point where this stream at the conditions of the zone will be in substantial equilibrium with the material undergoing fractionation in the zone at this point. It is to be understood that any of the previously described embodiments of the inventions pertaining to prefractionation of the feed may be utilized with equal advantage.

In one of the preferred embodiments of the invention, the excellent heat exchange quality of the high pressure liquid is utilized to provide the necessary reboiling of the bottoms fraction in the subsequent fractionation to remove methane, prior to the prefractionation of at least part of the high pressure liquid. The warm liquid stream is passed through the bottoms section of the fractionation zone in a closed conduit and exits at a temperature which may range from about —145° F. to about —190° F., after which it is fed to the prefractionation zone.

The at least partially prefractionated feed is introduced in the fractionation zone which serves to remove methane from a mixture comprising methane and nitrogen. The tower can be operated at an average pressure ranging from about 150 p.s.i.a. to about 400 p.s.i.a., a top temperature ranging from about —270° F. to about —240° F., a reflux ratio ranging from about 0.6 to about 1.0 and a bottoms temperature ranging from —190° F. to about —145° F. An overhead product comprising nitrogen and argon and a bottoms product comprising methane are withdrawn, the methane being one of the products of the process. In one of the preferred aspects of the invention the methane product is introduced into the reflux condenser to serve as cooling medium after being subcooled to a suitable temperature against a colder process stream.

In another preferred aspect of this invention at least part of the process nitrogen product obtained from a subsequent refining step is combined with the methane stream, and the combined stream is introduced into the reflux condenser at a suitable temperature as coolant. The presence of nitrogen will reduce the boiling point of the methane and will enable operations of the methane stripper at a substantially lower pressure than would be possible without the addition of nitrogen. The lowering of the tower pressure will result in increased efficiency of the final argon recovery as well as the ability of the process to produce a major portion of the argon in liquid form.

The overhead stream from the methane fractionation zone is withdrawn as a mixed-phase stream, which, when subsquently reduced in pressure, is vaporized further into a vapor phase and a liquid phase. The partially vaporized stream is introduced into a rectification zone which can be operated at a temperature ranging from about —280° F. to about —250° F. and at a pressure ranging from about 90 p.s.i.a. to about 200 p.s.i.a. A bottoms product rich in argon and a liquid overhead lean in argon are produced. In addition a small stream of uncondensed material is withdrawn from the top of the zone, said material comprising nitrogen and hydrogen. The purpose of this rectification step is threefold: (1) it performs a crude splitting of the nitrogen/argon stream thereby producing a suitable feed for the final production of argon of high purity; (2) it produces the reflux stream necessary for the subsequent fractionation of the argon rich stream, and (3) it removes a major portion of any hydrogen still remaining in the nitrogen/argon stream, thus improving the argon recovery in the final fractionation step.

The liquid overhead stream from the rectification zone is subcooled against a colder process stream to a temperature which can range between about —290° F. and about —320° F., and such that at least a major portion of the stream will remain in liquid phase at the pressure of the subsequent fractionation step. Preferably, the heat exchange is carried out against at least a portion of the overhead product, comprising nitrogen, from the subsequent fractionation step. The pressure of the cooled stream is then reduced to about that of the zone used for the subsequent fractionation and introduced above the top tray of said zone to provide the necessary reflux.

The bottoms product from the rectification zone is subcooled in indirect heat exchange with a colder process stream, preferably against the overhead product from the subsequent fractionation, to a temperature which can range between about −310° F. and about −280° F., and such that said stream will be partially vaporized at the pressure of the subsequent fractionation. The subcooled bottoms product is fed to a final fractionation zone which can be operated at a temperature ranging between about −300° F. and about −320° F. and at a pressure ranging between about 17 p.s.i.a. and about 30 p.s.i.a. and an overhead product comprising nitrogen and bottom product comprising argon of high purity are withdrawn, the nitrogen and the argon being products of the process.

In a preferred embodiment of the invention at least part of the subcooled bottoms product from the rectification zone is prefractionated prior to being fed to the fractionation zone, in the same manner as the feed to the fractionation zone for removing methane was prefractionated, to reduce the reflux and reboiler requirements of the final fractionation.

In still another embodiment the uncondensed material from the rectification zone is subcooled against a colder process stream to condense at least a portion of the nitrogen contained in said uncondensed material thereby increasing the overall process nitrogen and argon recovery. Preferably, the cooling is carried out by heat exchange against a portion of the subcooled bottoms product from the rectification zone. The recovered nitrogen product can then be combined with the liquid overhead product from the rectification zone. The noncondensed material from the rectification zone can, if desired, be reduced in pressure and combined with the overhead product comprising nitrogen from the final fractionation zone.

The rectification zone and the final fractionation zone can be of any feasible design; however, in order to minimize or obviate the need for extraneous utilities it is preferred to design the zones in such a way that the reboiler of the final fractionation zone serves as the reflux condenser of the rectification zone, thereby obtaining a highly efficient use of the available heat content of the process streams. This can be accomplished, for instance, by designing the final fractionation zone as an extension of the rectification zone, the two zones being separated from each other such that no interchange of material can occur from one zone to the other.

Refrigeration is recovered from the nitrogen product stream, comprising the final overhead product stream, which can exit at a temperature between about −320° F. and about −310° F. Thus, the feed and the reflux stream to the final fractionation zone are cooled by indirect heat exchange with the nitrogen product stream. The methane product stream can also be cooled against this stream prior to its introduction as reflux cooling medium to the methane fractionation zone. The nitrogen product stream can also be used to provide part of the necessary refrigeration for the partial condensation of the ammonia-free gas as well as part of the refrigeration needed to condense a major portion of the ammonia present in the original feed to the process.

In one of the preferred embodiments of the invention already discussed, at least part of the nitrogen product is mixed with methane product to provide reflux cooling to the methane fractionation zone. In this case the mixed stream is not a suitable recycle stream to the ammonia synthesis loop and will instead constitute part of the process tail gas which can be utilized as fuel in the primary reformer furnace, after the recovery of refrigeration from the mixed stream.

There are several advantages to the process of the described invention in addition to its ability to produce argon of high quality, e.g., it will increase the overall ammonia yield of the ammonia synthesis by the recovery of ammonia from the purge gas stream, it will reduce the fresh feed requirements of the ammonia synthesis by the return to the synthesis loop of the recovered hydrogen. Similarly it may reduce the fresh feed requirements of the ammonia synthesis by the return of the recovered nitrogen to the synthesis loop.

FIG. 2 depicts one of the embodiments of the invention pertaining to the prefractionation of the feed to a fractionation zone, where the pressure of the flash zone is maintained at a pressure substantially higher than that of the fractionation zone.

FIG. 3 illustrates another embodiment of the invention, where only part of the feed to a fractionation zone is prefractionated.

FIG. 4 shows still another embodiment of the invention where the vapor/liquid ratio of the flashed stream is sufficiently low that no seperation of phases is necessary prior to the further vaporization of the flashed liquid in the heat exchange zone of the prefractionation zone.

FIG. 5 shows a modification of the embodiment of FIG. 4, where the average enthalpy of the total tower feed is maintained at a desired level by additional cooling of the high pressure feed, employing an extraneous process stream, tower bottoms and excess flashed feed material as refrigerants.

Figure 1:
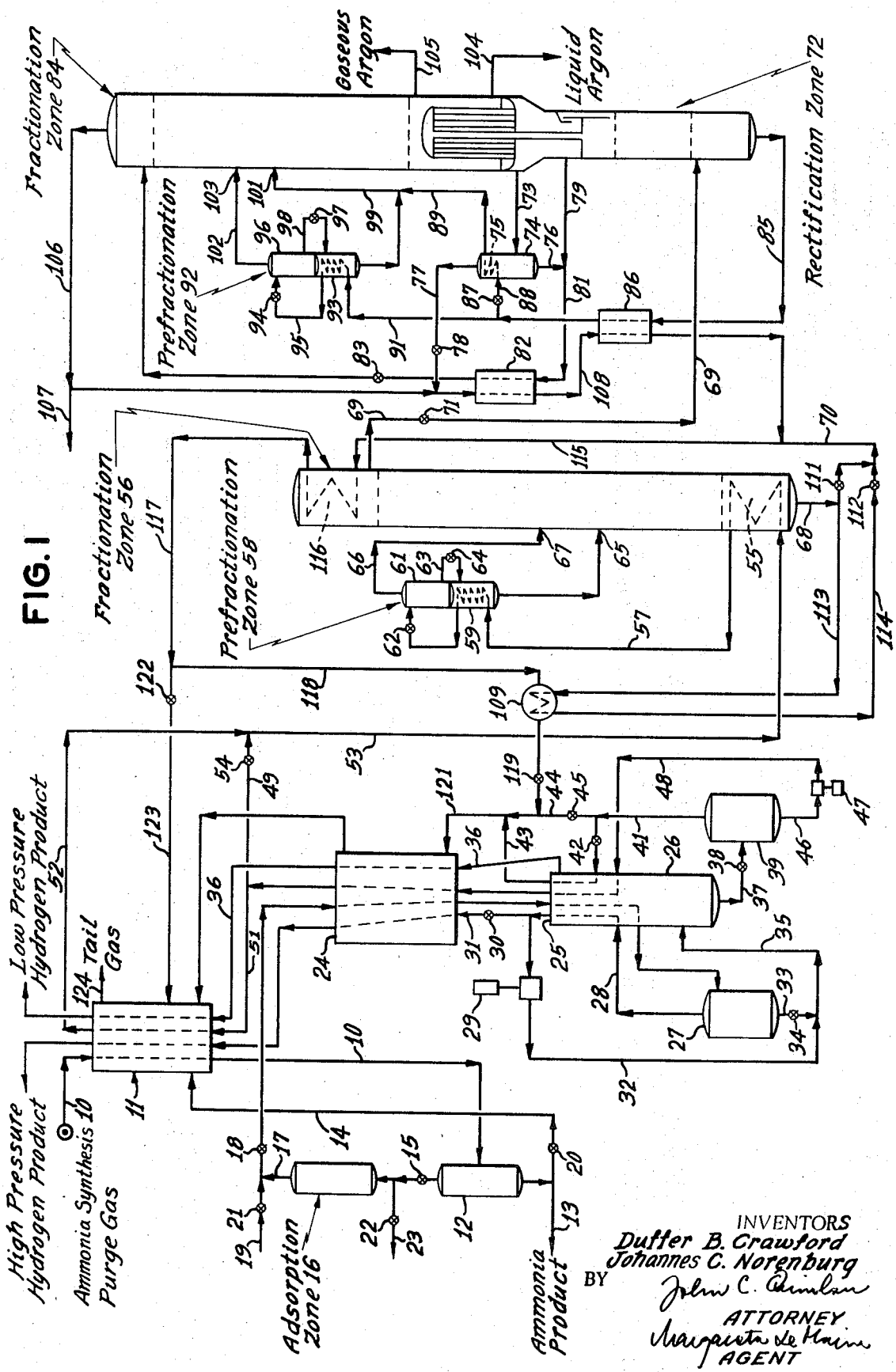
FIG. 1 is a diagrammatic illustration of a preferred embodiment of the invention as it pertains to a process for the separation of a purge gas originating from what is known as a low-pressure ammonia synthesis.

It is to be understood that the drawings are only shown in sufficient detail to fully understand the invention and that some of the necessary process equipment for the proper execution of the process, e.g., instrumentation, bleed lines, etc., have been omitted.

Referring to FIG. 1 the feed gas is a purge gas stream from an ammonia synthesis loop (not shown), said gas typically containing approximately 80 mole percent of hydrogen and nitrogen in about a 3:1 mole ratio, approximately 8 mole percent of methane and argon in about a 2:1 mole ratio and the remaining portion of the gas being ammonia. The feed gas is introduced in line 10 at about a pressure of 2,200 p.s.i.a and a temperature of about −10° F. The gas stream is cooled to about −100° F. by indirect heat exchange in heat exchanger 11 to condense a major portion of the ammonia present in the gas and subsequently fed to separation drum 12 where condensed ammonia is withdrawn. Ammonia product can either be withdrawn from drum 12 through valve 13 or, as is necessary in this example for the heat balance of the cooling step performed in heat exchanger 11, withdrawn through pressure reducing valve 20 located in line 14 and injected into the tail gas stream passing through exchanger 11 and exiting through line 124. The uncondensed gases from drum 12 are fed to one or more of the adsorption zones 16, where residual ammonia is adsorbed on a suitable adsorbent. The ammonia-free gas leaving the adsorption zone 16 through line 17 and valve 18 is cooled by indirect heat exchange in exchanger 24 and further in heat exchange section 25 of drum 26 to a final temperature of about −300° F. to partially condense the gas and introduced into drum 27 where the liquid and gas phases are separated. The hydrogen-rich gas phase also containing nitrogen, argon and methane is withdrawn from drum 27 through line 28 and reheated in heat exchanger section 25 of drum 26 to a temperature of about −240° F. and subsequently expanded in expander 29 to about 400 p.s.i.a. Although in this specific example all of the gas in line 28 is expanded in expander 29, there are other cases where it is desirable to remove part of the high pressure gas as a product of the process. This is accomplished by withdrawing the desired amount through flow control valve 30 located in line 31. The expanded gas stream exiting through line 32 has a temperature of about −303° F. The liquid phase containing hydrogen, nitrogen, argon and methane is withdrawn from the top of drum 26 through line 33 and reduced in pressure to about 400 p.s.i.a. by means of valve 34 in line 33. This stream is combined with the expanded gas in line 32 and fed through line 35 to flash drum 26. A second hydrogen-rich gas stream, also containing quantities of nitrogen, argon and methane is withdrawn from the top of drum 26 through line 36 and reheated in exchanger 24 to about −127° F. and subsequently passed through heat exchanger 11 where it is warmed to approximately −25° F. The liquid from drum 26 is withdrawn through line 37 and reduced in pressure to about 195 p.s.i.a. by means of valve 38 in line 37 and introduced into flash drum 39 at at a temperature of about −303° F. A third hydrogen-rich flash gas from drum 39 is withdrawn through line 41 and valve 42 and introduced in the heat exchanger section 25 of drum 26 where its temperature is increased to −240° F. In this particular example all of the flash gas from drum 39 is heated in heat exchanger section 25. However, it might be desirable in other situations to control the temperature of the flash gas at some other level, and provisions are therefore made to regulate the flow of the gas through heat exchanger section 25 by valve 42 and valve 45 located in line 44. The liquid stream from drum 39 consisting of hydrogen, nitrogen, argon and methane is withdrawn through line 46 and its pressure is increased to about 2,000 p.s.i.a. by means of pump 47. The high pressure liquid is fed through line 48 through heat exchangers 25 and 24. A portion of the fluid is withdrawn through line 49 and the remaining portion is fed through line 51 through heat exchanger 11 and subsequently through line 52 after which it is recombined with stream 49 in line 53. The apportionment of the fluid streams passing through lines 49 and 51 is controlled by temperature control valve 54 in line 49 such that the final temperature of the recombined streams in line 53 is maintained at about −110° F. This stream is subsequently fed to the reboiling zone 55 of fractionation zone 56 and withdrawn through line 57 at a temperature of about −171° F. after which it is introduced into heat exchange zone 59 of the prefractionation zone 58, where it is cooled to about −230° F. by indirect heat exchange. The pressure is reduced to about 205 p.s.i.a. by means of pressure letdown valve 62 and the stream is subsequently fed to flash drum 61 of the prefractionation zone 58, where a gas phase and a liquid phase are obtained. A portion of the liquid phase consisting of nitrogen, argon and methane is withdrawn at a temperature of about −243° F. from drum 61 through line 63, the flow being controlled by valve 64 in line 63. This portion is heated in heat exchanger 59 to a temperature of about −208° F. at which temperature a major part of the portion is vaporized. The stream is introduced to the trayed fractionation zone 56 at feed point 65. The combined stream of the vapor and the remaining portion of the liquid from drum 61 consisting of hydrogen, nitrogen, argon and methane is withdrawn through line 66 and introduced into fractionation zone 56 at feed point 67. The bottoms product of fractionation zone 56 consisting of substantially pure methane is withdrawn through line 68 at a temperature of about −176° F. The methane product is cooled by flowing a controlled amount of said product through line 113 into heat exchanger 109 and then through pressure reducing control valve 112 located in line 114 into line 70, where it is combined with the remaining portion of the methane product which is passed through pressure reducing control valve 111. In this example all of the methane product from line 68 is cooled in heat exchanger 109. The overhead product comprising hydrogen, nitrogen, and argon is withdrawn through line 69 at a temperature of about −270° F. and depressured by means of pressure reducing valve 71 to about 153 p.s.i.a. after which it is introduced into the rectification zone 72. A noncondensed vapor stream is withdrawn through line 73, the composition of the stream being hydrogen, nitrogen and very minor quantities of argon. This stream is cooled to −305° F. in drum 74 by means of coil 75 to recover condensable material. The condensate comprising nitrogen and argon is withdrawn through line 76. The uncondensed vapors containing all but a very minor quantity of the residual hydrogen, some nitrogen and argon is withdrawn through line 77 and reduced in pressure to about 20 p.s.i.a. by means of valve 78 in line 77. A liquid overhead product from rectification zone 72 containing the remaining portion of hydrogen, in addition to nitrogen and argon is withdrawn through line 79 at a temperature of −289° F. and a pressure of about 150 p.s.i.a. and is subsequently combined with the stream from line 76 and introduced through line 81 into heat exchanger 82 where it is cooled to −311° F. The pressure of this stream is reduced to about 21 p.s.i.a. by means of valve 83 and this stream is introduced above the top tray of the fractionation zone 84 as reflux.

The bottoms fraction from rectification zone 72 containing nitrogen and argon is withdrawn at −270° F. through line 85 and fed through heat exchanger 86 where it is cooled to −286° F. A minor portion of this stream is reduced in pressure to about 21 p.s.i.a. by means of valve 87 in line 88 and subsequently introduced into cooling coil 75 in drum 74 at −311° F. This stream exiting at −307° F. is withdrawn through line 89. The remaining portion of the stream emanating from line 85 is introduced by means of line 91 into heat exchange section 93 of the prefractionation zone 92 where it is cooled to −306° F. The cooled stream is reduced in pressure to 21 p.s.i.a. by valve 94 located in line 95 and subsequently fed into flash drum 96 of the prefractionator 92. A portion of the liquid stream is withdrawn through flow control valve 97 located in line 98 and is vaporized in heat exchange section 93 by indirect heat exchange with the stream in line 91 and is subsequently combined with the vapor stream flowing through line 89. The combined stream is introduced through line 99 at −307° F. into the fractionation zone 84 at feed point 101. A combined stream of the vapors and the remaining liquid portion from drum 96 containing nitrogen and argon is withdrawn at −311° F. through line 102 and fed to fractionation zone 84 at the feed point 103. The bottoms product from tower 84 consisting essentially of liquid argon is withdrawn at −295° F. and 23 p.s.i.a. through line 104. This specific example relates to a process for producing liquid argon, however, if the process conditions were altered such that at least part of the argon product was produced in gaseous form, the gaseous product would be withdrawn through line 105. The nitrogen-rich overhead product, also containing argon and minor quantities of hydrogen is withdrawn at −315° F. and 19.8 p.s.i.a. through line 106. A small portion of this stream may be removed through line 107 to be used as a cold-box purge gas. In this example, however, the total overhead product is joined by the stream in line 77 and the combined stream is passed through heat exchanger 82 through line 108 where it is heated to −298° F. and further passed through heat exchanger 86 where it exits at −274° F. and is finally combined with the methane stream flowing through line 70 at 18 p.s.i.a. and having a temperature of −255° F. The combined stream of nitrogen and methane is introduced through line 115 into the reflux condenser 116 of fractionation zone 56 at −280° F. and withdrawn from said condenser at −272° F. through line 117. A portion of this stream is fed through line 118 and is subsequently heat exchanged with the methane stream thereafter in heat exchanger 109 where it attains a temperature of −250° F. and is combined with the flash gases flowing either through line 43 or line 44 or through both of these lines simultaneously as the case may be. The combined stream is fed through heat exchangers 24 and 11. The remaining portion of the stream originating from line 117 is fed directly by way of line 123 into heat exchanger 11 where it is combined with the gas stream flowing through line 121. The combined tail gas stream leaves exchanger 11 at −25° F. through line 124 after which it may be sent to the primary reformer furnace not shown on the drawing, as fuel. The control of the flow through lines 118 and 123 is carried out by means of valve 119 located in line 118 and valve 122 located in line 123. The regeneration of the adsorption zone 16 is carried out by closing valves 15 and 18, and opening valves 21 and 22 and passing the regeneration gas through the adsorption zone 16 via lines 19 and 23.

Referring to FIG. 2, the feed enters through line 130 and is cooled in heat exchange zone 131. The cooled feed is reduced in pressure by means of pressure letdown valve 133 located in line 132 and introduced into flash zone 134 where the feed is separated into a vapor phase and a liquid phase. A portion of the liquid phase is withdrawn through line 135, reduced further in pressure by means of flow control valve 136 and then at least partially vaporized in heat exchange zone 131, after which it is fed through line 137 to fractionation zone 139 at feed point 138.

The remaining liquid portion and the vapor phase are withdrawn through line 141 and reduced further in pressure by means of flow control valve 140 and subsequently introduced into fractionation zone 139 at feed point 142.

In FIG. 3 part of the feed entering through line 150 is fed via line 151 to heat exchange zone 152 where it is cooled. The cooled feed is reduced in pressure by means of pressure letdown valve 153 located in line 154 after which it is introduced into fractionation zone 156 at feed point 155.

The remaining portion of the feed is reduced in pressure by means of pressure letdown valve 158 located in line 157 and subsequently fed to flash zone 159 where it is separated into a vapor phase and a liquid phase. A portion of the liquid phase is withdrawn through flow control valve 161 located in line 160 and at least partially vaporized in heat exchange zone 152 after which it is introduced into fractionation zone 156 at feed point 163 by means of line 162. The remaining liquid portion and the vapor phase are withdrawn through line 164 and pressure control valve 165 and introduced into fractionation zone 156 at feed point 166.

Referring to FIG. 4, feed enters through line 250 and is reduced in temperature by heat exchange with a stream 251 in heat exchange zone 252, after which it is introduced into a second heat exchange zone 253 where it is cooled further. A portion of the cooled stream is reduced in pressure in a flash zone comprised of pressure reducing valve 256 and conduit 257. The mixed vapor and liquid stream resulting from the flashing is heated in heat exchange zone 253 causing vaporization of the mixed stream which is subsequently introduced to fractionation zone 258 at a suitable point. Another portion of the cooled feed from heat exchange zone 253 is reduced in pressure by means of valve 259 located in conduit 261 and subsequently introduced to fractionation zone 258.

The process as it is shown in FIG. 4 as well as in FIGS. 1–3 is carried out adiabatically in the sense that neither heat nor refrigeration is added to the prefractionation zone, which in FIG. 4 includes the heat exchange zone 253, a first flash zone comprising the pressure reducing valve 256 and the conduit 257 and a second flash zone comprising the pressure reducing valve 259 and the conduit 261. A prerequisite for the process to work adiabatically is therefore the maintenance of particular temperature level of the liquid feed in heat exchanger 253 commensurate with the pressure of fractionation zone and the amount of prefractionation desired. More often than not, however, the feed is not directly available at such a desired level and it may therefore be necessary to cool the feed prior to the prefractionation. Such a case has been shown on FIG. 4, where the feed is passed through heat exchange zone 252 prior to its introduction into heat exchange zone 253 of the prefractionation zone. It is to be understood, however, that part or all of such cooling can be carried out equally well in the heat exchange zone of the prefractionation zone as shown in FIG. 5.

In this embodiment, the feed in line 301 comprising a mixture of a relatively low-boiling component, e.g., nitrogen and a relatively high boiling component, e.g., methane, is partially cooled in heat exchange zone 302 and is subjected to further cooling in heat exchange zone 303. A portion of the cooled liquid mixture is reduced in pressure by means of valve 307 located in line 308 to partially flash-vaporize said portion and the resultant vapor-liquid mixture is introduced to fractionation zone 309. Another portion of the cooled liquid mixture is withdrawn in line 306 reduced in pressure by means of valve 311 to partially flash-vaporize said portion, which is subsequently reintroduced to heat exchange zone 303 where it is heated to increase the vapor-liquid ratio and is finally introduced via conduit 312 to fractionation zone 309. The bottoms product from the fractionation zone 309 being enriched in the relatively high boiling component, e.g., methane, is withdrawn through line 313 and introduced in heat exchange zone 302 to cool the incoming feed in line 301. An extraneous process stream flowing in line 304 serves as coolant in the heat exchange zones 303 and 302.

FIG. 5 also exemplifies a case, where notwithstanding the cooling accomplished by streams 304 and 313, the enthalpy of the feed exiting heat exchanger 303 is too high to achieve a desired fractionation in the fractionation zone. This problem is overcome by allowing excess feed material to enter the system through line 301, withdrawing the excess as flashed material through valve 314 situated in line 316 and subsequently passing it through heat-exchange zone 302. By taking advantage of the refrigeration potential of the excess feed after flashing, the average enthalpy of the tower feed is decreased to the desired level. The excess feed exiting heat exchange zone 301 may be recycled to the system after compression.

It will become apparent to those skilled in the art that many modifications and variations of the above embodiments can be made without departing from the scope of the invention.

Having thus described the invention, we claim:

1. In a process for the fractionation of a normally gaseous feed mixture of at least two components, the method of prefractionation of at least part of the feed mixture prior to its introduction to the fractionation zone, which comprises:

flashing a least part of the feed mixture at a pressure at least above that of the fractionation zone to obtain a vapor phase and a liquid phase;

partially vaporising at least a portion of said liquid phase by indirect heat exchange with a stream consisting of at least a portion of said feed mixture;

introducing at least a portion of said partially vaporized liquid phase into the fractionation zone, and introducing at least a portion of said vapor phase into the fractionation zone, all of the parts and portions having the same composition as that of the material from which it was taken.

2. A process according to claim 1, wherein one component of the feed mixture is nitrogen.

3. A process according to claim 1, wherein the vapor phase and the liquid phase are separated prior to partially vaporizing liquid phase.

4. A process according to claim 2, wherein another component is methane.

5. A process according to claim 2, wherein another component is argon.

6. In a process for the fractionation of a normally gaseous feed mixture of at least two components, the method of prefractionation of at least part of the feed mixture prior to its introduction to the fractionation zone, which comprises:

flashing a least part of the feed mixture at a pressure at least above that of the fractionation zone to obtain a vapor phase and a liquid phase;

introducing a first portion of said liquid phase into the fractionation zone;

introducing the vapor phase into the fractionation zone;

at least partially vaporizing a second portion of said liquid phase by indirect heat exchange with at least part of said feed mixture and introducing said heat exchanged second portion into the fractionation zone, all of the parts and portions having the same composition as that of the material from which it was taken.

7. In a process for the fractionation of a feed mixture containing nitrogen and argon, the method of prefractionation of at least part of the feed mixture prior to its introduction to the fractionaion zone, which comprises:
cooling in a heat exchange zone at least part of the feed mixture at a pressure substantially above that of the main fractionation zone;
flashing the cooled feed mixture at a pressure at least above that of the fractionation zone to obtain a vapor phase richer in nitrogen and leaner in argon than the feed mixture and a liquid phase leaner in nitrogen and richer in argon than the feed mixture;
introducing a first portion of said liquid phase into the fractionation zone;
introducing the vapor phase into the fractionation zone;
at least partially vaporizing a second portion of said liquid phase by indirect heat exchange with the feed mixture cooling in said heat exchange zone, and
introducing said heat exchanged second portion into the fractionation zone,
all of the parts and portions having the same composition as that of the material from which it was taken.

8. In a process for the fractionation of a feed mixture containing methane, nitrogen and argon, the method of prefractionation of at least part of the feed mixture prior to its introduction to the fractionation zone, which comprises:
cooling in a heat exchange zone at least part of the feed mixture at a pressure substantially above that of the main fractionation zone;
flashing the cooled feed mixture at a pressure at least above that of the fractionation zone to obtain a vapor phase richer in nitrogen and argon and leaner in methane than the feed mixture and a liquid phase leaner in nitrogen and argon and richer in methane than the feed mixture;
introducing a first portion of said liquid phase into the fractionation zone;
introducing the vapor phase into the fractionation zone;
at least partially vaporizing a second portion of said liquid phase by indirect heat exchange with the feed mixture cooling in said heat exchange zone, and
introducing said heat exchanged second portion into the fractionation zone,
all of the parts and portions having the same composition as that of the material from which it was taken.

9. A process for the separation of an ammonia synthesis purge gas stream containing ammonia, hydrogen, nitrogen, methane and argon, which comprises:
removing ammonia from the purge gas stream to obtain a substantially ammonia-free gas;
condensing the ammonia-free gas by indirect heat exchange with a colder process stream to obtain a condensate comprising hydrogen, nitrogen, methane and argon and an uncondensed gas rich in hydrogen;
reducing the pressure of the condensate to obtain a flash gas rich in hydrogen and a liquid stream comprising nitrogen, methane and argon;
raising the pressure of the liquid stream;
heating the liquid stream by indirect heat exchange with a warmer process stream;
cooling at least part of said heated liquid stream in a heat exchange zone;
reducing the pressure of the cooled liquid stream from said heat exchange zone to obtain a vapor phase and a liquid phase;
withdrawing a portion of the liquid phase;
feeding the remaining portion of said liquid phase to a first fractionation zone;
feeding said vapor phase to said first fractionation zone;
at least partially vaporizing the withdrawn portion of said liquid phase by indirect heat exchange with the heated liquid stream cooling in said heat exchange zone;
feeding said heat exchanged withdrawn portion to said first fractionation zone;
separately withdrawing a product comprising methane and a product comprising nitrogen and argon from said first fractionation zone; and
fractionating product comprising nitrogen and argon in a second fractionation zone to obtain a product comprising nitrogen and product comprising argon.

10. A process according to claim 9 wherein the ammonia-free gas is reduced in pressure to a value ranging from about 1,000 p.s.i.a. to about 2,500 p.s.i.a. prior to cooling said ammonia-free gas by indirect heat exchange with a colder process stream.

11. A process for the separation of an ammonia synthesis purge gas stream containing ammonia, hydrogen, nitrogen, methane and argone, which comprises:
removing ammonia from the purge gas stream to obtain a substantially ammonia-free gas;
condensing the ammonia-free gas by indirect heat exchange with a colder process stream to obtain a condensate comprising hydrogen, nitrogen, methane and argon and an uncondensed gas rich in hydrogen;
reducing the pressure of the condensate;
warming the uncondensed gas by indirect heat exchange with a warmer process stream;
expanding at least a portion of said warmed uncondensed gas to obtain an expanded gas stream;
feeding the condensate of reduced pressure to a flash zone;
feeding the expanded gas stream to said flash zone;
separately withdrawing a flash gas rich in hydrogen and a liquid stream comprising nitrogen, methane and argon;
raising the pressure of said liquid stream;
heating said liquid stream by indirect heat exchange with a warmer process stream;
cooling at least part of said heated liquid stream in a heat exchange zone;
reducing the pressure of the cooled liquid stream from said heat exchange zone to obtain a vapor phase and a liquid phase;
withdrawing a portion of the liquid phase;
feeding the remaining portion of said liquid phase to a first fractionation zone;
feeding said vapor phase to said first fractionation zone;
at least partially vaporizing the withdrawn portion of said liquid phase by indirect heat exchange with the heated liquid stream cooling in said heat exchange zone;
feeding said heat exchanged withdrawn portion to said first fractionation zone;
separately withdrawing a product comprising methane and a product comprising nitrogen and argon from said first fractionation zone; and
fractionating product comprising nitrogen and argon in a second fractionation zone to obtain a product comprising nitrogen and product comprising argon.

12. A process for the separation of an ammonia synthesis purge gas stream containing ammonia, hydrogen, nitrogen, methane and argon, which comprises:
removing ammonia from the purge gas stream to obtain a substantially ammonia-free gas;
condensing the ammonia-free gas by indirect heat exchange with a colder process stream to obtain a condensate comprising hydrogen, nitrogen, methane and argon and an uncondensed gas rich in hydrogen;
reducing the pressure of the condensate;

warming the uncondensed gas by indirect heat exchange with a warmer process stream;
expanding at least a portion of said warmed uncondensed gas to obtain an expanded gas stream;
feeding the condensate of reduced pressure to a flash zone;
feeding the expanded gas stream to said flash zone;
separately withdrawing a flash gas rich in hydrogen and a liquid stream comprising hydrogen, nitrogen, methane and argon;
reducing the pressure of the liquid stream to obtain a second flash gas rich in hydrogen and a second liquid stream comprising nitrogen, methane and argon;
raising the pressure of the second liquid stream;
heating the second liquid stream by indirect heat exchange with a warmer process stream;
cooling at least part of said heated liquid stream in a heat exchange zone;
reducing the pressure of the cooled liquid stream from said heat exchange zone to obtain a vapor phase and a liquid phase;
withdrawing a portion of the liquid phase;
feeding the remaining portion of said liquid phase to a first fractionation zone;
feeding said vapor phase to said first fractionation zone;
at least partially vaporizing the withdrawn portion of said liquid phase by indirect heat exchange with the heated liquid stream cooling in said heat exchange zone;
feeding said heat exchanged withdrawn portion to said first fractionation zone having a reboiling zone and a reflux condensing zone;
separately withdrawing a product comprising methane and a product comprising nitrogen and argon from said first fractionation zone; and
fractionating product comprising nitrogen and argon in a second fractionation zone to obtain a product comprising nitrogen and product comprising argon.

13. A process according to claim 12 wherein the heated liquid stream, prior to being cooled in the heat exchange zone, is indirectly heat exchanged with the contents of the reboiling zone of the first fractionation zone to provide heat for reboiling said contents.

14. A process according to claim 12 wherein the following additional steps are undertaken, comprising:
cooling at least a portion of the product comprising methane by indirect heat exchange with a colder process stream, and evaporating the cooled methane as coolant in the reflux condensing zone of the first fractionation zone.

15. A process according to claim 14, wherein the following additional step is undertaken prior to evaporating the cooled methane as coolant in the reflux condensing zone of the first fractionation zone, which comprises:
combining at least part of the product comprising nitrogen from the second fractionation zone with the cooled methane product.

16. A process for the separation of an ammonia synthesis purge gas stream containing ammonia, hydrogen, nitrogen, methane and argon which comprises:
removing ammonia from the purge gas stream to obtain a substantially ammonia-free gas;
condensing the ammonia-free gas by indirect heat exchange with a colder process stream to obtain a condensate comprising hydrogen, nitrogen, methane and argon and an uncondensed gas rich in hydrogen;
reducing the pressure of the condensate;
warming the uncondensed gas by indirect heat exchange with a warmer process stream;
expanding at least a portion of said warmed uncondensed gas to obtain an expanded gas stream;
feeding the condensate of reduced pressure to a flash zone;
feeding the expanded gas stream to said flash zone;
separately withdrawing a flash gas rich in hydrogen and a liquid stream comprising hydrogen, nitrogen, methane and argon;
reducing the pressure of the liquid stream to obtain a second flash gas rich in hydrogen and a second liquid stream comprising hydrogen, nitrogen, methane and argon;
raising the pressure of the second liquid stream;
heating the second liquid stream by indirect heat exchange with a warmer process stream;
cooling at least part of said heated liquid stream in a heat exchange zone;
reducing the pressure of the cooled liquid stream from said heat exchange zone to obtain a vapor phase and a liquid phase;
withdrawing a portion of the liquid phase;
feeding the remaining portion of said liquid phase to a first fractionation zone;
feeding said vapor phase to said first fractionation zone;
at least partially vaporizing the withdrawn portion of said liquid phase by indirect heat exchange with the heated liquid stream cooling in said heat exchange zone;
feeding said heat exchange withdrawn portion to said first fractionation zone having a reboiling zone and a reflux condensing zone;
separately withdrawing a product comprising methane and a product comprising hydrogen, nitrogen and argon from said first fractionation zone;
cooling at least a portion of the product comprising methane by indirect heat exchange with a colder process stream;
evaporating the cooled methane as coolant in the reflux condensing zone of the first fractionation zone;
rectifying the product comprising hydrogen, nitrogen an argon in a rectification zone to produce an uncondensed product comprising hydrogen and nitrogen, a liquid product comprising nitrogen and a liquid product comprising nitrogen and argon;
introducing product comprising nitrogen from said rectification zone to the top portion of a second fractionation zone as reflux for said zone; and
fractionating product comprising nitrogen and argon from said rectification zone in said second fractionation zone to obtain a product comprising nitrogen and product comprising argon.

17. A process according to claim 16, wherein the following additional step is undertaken prior to evaporating the cooled methane as coolant in the reflux condensing zone of the first fractionation zone, which comprises:
combining at least part of the product comprising nitrogen from the second fractionation zone with the cooled methane product.

18. A process according to claim 16, wherein the following additional step is undertaken which comprises:
condensing by indirect heat exchange with a colder process stream the uncondensed product comprising nitrogen and hydrogen from the rectification zone to produce a condensate comprising nitrogen and an uncondensed product comprising hydrogen.

19. A process according to claim 18, wherein the following additional step is undertaken prior to evaporating the cooled methane as coolant in the reflux condensing zone of the first fractionation zone, which comprises:
combining at least part of the product comprising nitrogen from the second fractionation zone with the cooled methane product.

20. A process for the separation of an ammonia synthesis purge gas stream containing ammonia, hydrogen, nitrogen, methane and argon, which comprises:

removing ammonia from the purge gas stream to obtain a substantially ammonia-free gas;
condensing the ammonia-free gas by indirect heat exchange with a colder process stream to obtain a condensate comprising hydrogen, nitrogen, methane and argon and an uncondensed gas rich in hydrogen;
reducing the pressure of the condensate;
warming the uncondensed gas by indirect heat exchange with a warmer process stream;
expanding at least a portion of said warmed uncondensed gas to obtain an expanded gas stream;
feeding the condensate of reduced pressure to a flash zone;
feeding the expanded gas stream to said flash zone;
separately withdrawing a flash gas rich in hydrogen and a liquid stream comprising hydrogen, nitrogen, methane and argon;
reducing the pressure of the liquid stream to obtain a second flash gas rich in hydrogen and a second liquid stream comprising hydrogen, nitrogen, methane and argon;
raising the pressure of the second liquid stream;
heating the second liquid stream by indirect heat exchange with a warmer process stream;
cooling at least part of said heated liquid stream in a heat exchange zone;
reducing the pressure of the cooled liquid stream from said heat exchange zone to obtain a vapor phase and a liquid phase;
withdrawing a portion of the liquid phase;
feeding the remaining portion of said liquid phase to a first fractionation zone;
feeding said vapor phase to said first fractionation zone;
at least partially vaporizing the withdrawn portion of said liquid phase by indirect heat exchange with the heated liquid stream cooling in said heat exchange zone;
feeding said heat exchanged withdrawn portion to said first fractionation zone having a reboiling zone and a reflux condensing zone;
separately withdrawing a product comprising methane and a product comprising hydrogen, nitrogen and argon from said first fractionation zone;
cooling at least a portion of the product comprising methane by indirect heat exchange with a colder process stream;
evaporating the cooled methane as coolant in the reflux condensing zone of the first fractionation zone;
rectifying the product comprising hydrogen, nitrogen and argon in a rectification zone to produce an uncondensed product comprising hydrogen and nitrogen, a liquid product comprising nitrogen and a liquid product comprising nitrogen and argon;
introducing product comprising nitrogen from said rectification zone to the top portion of a second fractionation zone as reflux for said zone;
cooling at least part of the liquid product stream comprising nitrogen and argon from the rectification zone in a second heat exchange zone;
reducing the pressure of the cooled liquid product stream from said second heat exchange zone to obtain a second vapor phase and a second liquid phase;
withdrawing a portion of said second liquid phase;
feeding the remaining portion of said second liquid phase to said second fractionation zone;
feeding said second vapor phase to said second fractionation zone;
at least partially vaporizing the withdrawn portion of said second liquid phase by indirect heat exchange with the liquid product stream comprising nitrogen and argon cooling in the second heat exchange zone;
feeding said heat exchanged withdrawn portion of said second liquid phase to said second fractionation zone, and
separately withdrawing a product comprising nitrogen and product comprising argon from said second fractionation zone.

21. A process according to claim 20, wherein the following additional step is undertaken prior to evaporating the cooled methane as coolant in the reflux condensing zone of the first fractionation zone, which comprises:
combining at least part of the product comprising nitrogen from the second fractionation zone with the cooled methane product.

22. A process according to claim 21, wherein the following additional step is undertaken which comprises:
condensing by indirect heat exchange with a colder process stream the uncondensed product comprising nitrogen and hydrogen from the rectification zone to produce a condensate comprising nitrogen and an uncondensed product comprising hydrogen.

23. A process according to claim 6 wherein the part of the feed mixture which is subjected to said flashing is the same part of the feed which is subjected to said indirect heat exchange.

References Cited

UNITED STATES PATENTS

| | | | |
|---|---|---|---|
| 2,767,133 | 10/1956 | Shobe | 203—1 |
| 2,768,940 | 10/1956 | Rupp | 203—88 |
| 2,799,628 | 7/1957 | Barr et al. | 203—88 |
| 2,900,312 | 8/1959 | Gilmore | 203—2 |
| 2,040,112 | 5/1936 | Van Nuys | 62—22 |
| 2,423,274 | 7/1947 | Van Nuys | 62—22 |
| 2,699,046 | 1/1955 | Etienne | 62—31 |
| 2,993,342 | 7/1961 | Koble | 62—22 |
| 3,037,359 | 6/1962 | Knapp | 62—22 |
| 3,062,016 | 11/1962 | Dennis et al. | 62—22 |
| 3,292,380 | 12/1966 | Bucklin | 62—23 XR |
| 3,292,381 | 12/1966 | Bludworth | 62—27 XR |
| 3,293,869 | 12/1966 | Karbosky | 62—23 XR |
| 2,990,690 | 7/1961 | Martin | 62—22 |

WILBUR L. BASCOMB, JR., Primary Examiner

U.S. Cl. X.R.
62—28, 29, 31, 41